US011880830B2

(12) United States Patent
Jain et al.

(10) Patent No.: US 11,880,830 B2
(45) Date of Patent: Jan. 23, 2024

(54) SYSTEMS AND METHODS FOR GENERATING, SECURING, AND MAINTAINING EMOJI SEQUENCE DIGITAL TOKENS

(71) Applicant: Emoji ID, LLC, Oakland, CA (US)

(72) Inventors: Naveen Kumar Jain, Nashville, TN (US); Riccardo Paolo Spagni, Plettenburg (ZA); Cayle Jon Sharrock, Johannesburg (ZA)

(73) Assignee: Emoji ID, LLC, Oakland, CA (US)

( * ) Notice: Subject to any disclaimer, the term of this patent is extended or adjusted under 35 U.S.C. 154(b) by 278 days.

(21) Appl. No.: 17/480,638

(22) Filed: Sep. 21, 2021

(65) Prior Publication Data

US 2022/0092588 A1 Mar. 24, 2022

Related U.S. Application Data

(60) Provisional application No. 63/081,184, filed on Sep. 21, 2020.

(51) Int. Cl.
*G06Q 20/38* (2012.01)
*H04L 9/32* (2006.01)
*H04L 9/00* (2022.01)

(52) U.S. Cl.
CPC ..... *G06Q 20/3827* (2013.01); *G06Q 20/3829* (2013.01); *G06Q 20/38215* (2013.01); *H04L 9/3247* (2013.01); *H04L 9/50* (2022.05); *H04L 2209/56* (2013.01)

(58) Field of Classification Search
CPC .................. G06Q 20/00–425; H04L 9/00–50
See application file for complete search history.

(56) References Cited

U.S. PATENT DOCUMENTS

| 10,169,566 B1 * | 1/2019 | Mossoba ................. G06F 40/12 |
| 2021/0173843 A1 * | 6/2021 | Ziebell .................... G06F 21/64 |

OTHER PUBLICATIONS

Andreas M. Antonopoulos, "Mastering Bitcoin", Dec. 1, 2014, O'Reilly Media, Inc., First Edition (Year: 2014).*

* cited by examiner

*Primary Examiner* — Ari Shahabi
(74) *Attorney, Agent, or Firm* — Nwamu, P.C.

(57) ABSTRACT

Accordingly, systems and methods for purchasing, securing, and maintaining emoji sequences is presented herein. In one or more examples, an enterprise or user can generate or purchase an emoji sequence, which can include a sequence of emojis that can be used to uniquely identify an enterprise. Once the emoji sequence has been acquired, in one or more examples, the emoji sequence can have a digital token associated with it, wherein the digital token can be derived from the emoji sequence string, in a manner that is unique and deterministic.

27 Claims, 8 Drawing Sheets

SYSTEMS AND METHODS FOR GENERATING, SECURING, AND MAINTAINING EMOJI SEQUENCE DIGITAL TOKENS

CROSS REFERENCE TO RELATED APPLICATIONS

This application claims the priority of U.S. Provisional Application No. 63/081,184, filed Sep. 21, 2020, the entire contents of which is incorporated herein by reference.

FIELD OF THE DISCLOSURE

This disclosure relates to systems and methods for generating, purchasing, securing, and maintaining digital tokens using a simplified string of characters such as a sequence of emojis that can be used to identify and access digital information regarding an entity in a safe and secure manner.

BACKGROUND OF THE DISCLOSURE

The internet and other digital technologies have allowed for businesses and other enterprises to communicate and interact with their customers in a variety of unique ways. For instance, a customer can access an enterprise's websites, social media accounts, and other information about a company that is publically available through the internet. Furthermore, customers can use the internet to not only access publically available information about a company, but also can conduct transactions over the internet with the enterprise such as buying products and services, remitting payments, sending and/or receiving documents, etc.

Because an enterprise, and especially a large enterprise, might have digital information located and stored in a plurality of locations, in order to communicate with an enterprise across all of its digital platforms, a customer would be required to be familiar with each and every location and the method by which to access the location in order to have access to the information about an enterprise. In the case of websites or social media platforms, the addresses at which to access these sites might be easy to remember. However, other methods of interacting with an enterprise digitally can be difficult to remember or may not be user-friendly. For instance, if a user wants remit payment for services or goods to an enterprise using an enterprise's digital wallet, then they would have to know the address or identification code for the enterprise's digital wallet.

As an example, wallet addresses for blockchain wallets are typically represented in human-legible form in one of three ways: as a hexadecimal representation, as a Base64 representation, or as a Base58 representation. In each of these common ways of representing the wallet addresses, each wallet address is represented using a string of letters and numbers, typically exceeding 20 characters in length. The length and randomness of the alphanumeric string makes the wallet address unwieldy and difficult to remember, thereby decreasing its usability and hindering the adoption of cryptocurrencies.

SUMMARY OF THE DISCLOSURE

Accordingly, systems and methods for purchasing, securing, and maintaining emoji sequences is presented herein. In one or more examples, an enterprise or user can generate or purchase an emoji sequence, which can include a sequence of emojis that can be used to uniquely identify an enterprise.

Once the emoji sequence has been acquired, in one or more examples, the emoji sequence can have a digital token associated with it, wherein the digital token can be derived from the emoji sequence string, in a manner that is unique and deterministic.

In one or more examples, ownership of the emoji sequence can be acquired by associating a private key encryption code with the emoji sequence such that the owner of the emoji sequence can modify the information associated with the emoji sequence using the private key, while customers of the enterprise or other entities that want to access the information associated with the emoji sequence can access the information using a public key.

In one or more examples, once ownership of the emoji sequence has been established, the owner of the emoji sequence can associate data with the emoji sequence, for instance by storing the data on nodes of a blockchain in the form of a merkle tree of associated and categorized data that can be accessed by a customer or user using the emoji sequence, but can only be modified by the owner of the emoji sequence. The process of acquiring an emoji sequence and associating with data is not limited to blockchain or other distributed ledger implementations.

For instance, in one or more examples, the data associated with an emoji sequence can be stored in a publically available relational database management system (RDMS), and associate the data with the emoji sequence via a FOREIGN Key. In one or more examples, the data associated with an emoji sequence can be stored in any type of database such as a key-value store (KVS) database.

In one or more examples, the owner of the emoji sequence can update the data associated with the emoji sequence by invalidating any old data and committing the updated data set (consolidating any of the changes made) using a cryptocurrency transaction that can be immutably recorded on the blockchain.

In one or more examples, if an owner of an emoji sequence would like to transfer the emoji sequence to another entity, then they can transfer the ownership by use of an atomic swap. In an atomic swap, the seller can receive payment on delivery of the asset, or else the transfer can fail completely.

DETAILED DESCRIPTION OF THE DISCLOSURE

Figure 1:
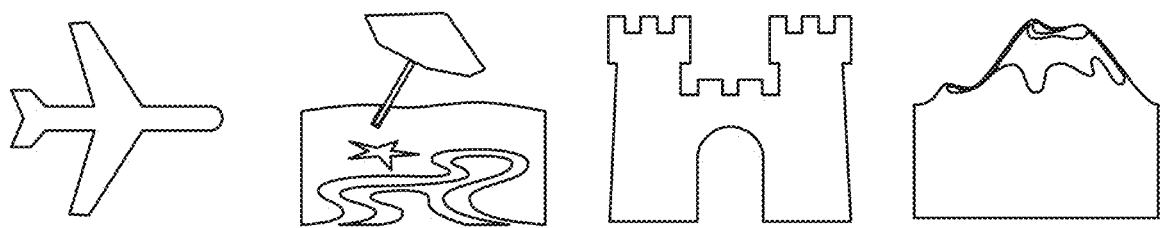
FIG. 1 illustrates an exemplary Emoji sequence according to examples of the disclosure.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a," "an," and "the" used in the following description are intended to include the plural forms as well unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

Certain aspects of the present Disclosure include process steps and instructions described herein in the form of an algorithm. It should be noted that the process steps and instructions of the present Disclosure could be embodied in software, firmware, or hardware, and, when embodied in software, they could be downloaded to reside on and be operated from different platforms used by a variety of operating systems.

The present disclosure also relates to a device for performing the operations herein. This device may be specially constructed for the required purposes or it may comprise a general-purpose computer selectively activated or reconfigured by a computer program stored in the computer. Such a computer program may be stored in a non-transitory, computer-readable storage medium such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application-specific integrated circuits (ASICs), or any type of media suitable for storing electronic instructions and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present Disclosure is not described with reference to any particular programming language. It will be appreciated that a variety of programming languages may be used to implement the teachings of the present Disclosure as described herein.

As the internet marketplace expands and takes over as the primary vehicle by which commerce is conducted, large and small companies can seek to establish a digital footprint in the marketplace. This can mean creating and cultivating numerous web sites, social media presences, and e-commerce sites to ensure that potential or actual customers can interact with the enterprise in a myriad of ways. Furthermore, as companies move to establish their online presence, they may also utilize tools available in the electronic marketplace to facilitate digital interaction with their customers, for instance by accepting online payments and allowing users to remit payments for services or goods using cryptocurrency technology.

However, establishing a large digital footprint using a variety of internet sites and digital tools can present challenges to customers. In order to interact with a particular enterprise, the customer may have to be familiar with and even memorize multiple web addresses, social media handles, etc., pertaining to a single company. In the example of remitting payment using cryptocurrency, often a customer would have to acquire or otherwise have knowledge of an enterprise's digital wallet ID. However, as described above, wallet addresses for cryptocurrency (i.e., blockchain) wallets are typically represented as long strings of random alphanumeric characters that can be difficult to remember and prone to entry mistakes by users.

Because having a large digital footprint (or any type of presence) can require the customer to memorize or otherwise have knowledge of the identity of and details of information pertaining to a company, it would be advantageous for the needed information to be stored in one consolidated location that can be accessed by a customer, and accessed in manner that is simplistic and doesn't require the user to memorize alpha-numeric sequences that may not be intuitive with respect to the enterprise.

Furthermore, because the above described consolidated information source can be critical to an enterprise's ability to engage with its customers, the information source should be secured insofar as only the company can edit the information, while the general public has only the ability to read or access the information without being able to modify the information in any way.

As described above, the information pertaining to a company such as their digital wallet can be identified using complicated sequences of alpha-numeric characters and sequences. Internet protocols such as the world-wide web can help to simplify accessing internet sites by allowing a user to type in a user-friendly web address using words and letters, rather than numerical IP addresses, however, as described above, a company's digital footprint can exist beyond internet websites, and thus internet protocols cannot provide a complete solution to the above identified problem.

Emojis can be utilized to provide a user with an easy and intuitive way to identify a company. Emoji's are miniature pictures that can be used to express thoughts, ideas, and concepts, that can be entered using a keyboard or software application, and can be entered without using alpha-numeric characters. As described in detail below, Emojis are often easier to remember for a typical internet user than an alpha-numeric address. Thus, a sequence of emojis rather than an alpha-numeric sequence can be better suited to ensuring that customer can successfully access information pertaining to a company.

FIG. 1 illustrates an exemplary Emoji sequence according to examples of the disclosure. In the examples described below, the term "emoji sequence" is used as an example of a type of ID that can be easy to remember and user-friendly, but the example of emoji sequences should not be seen as limiting. Other sequences of characters that may include a mixture of emoji and non-emoji characters, as well as sequences that do not include emojis can also fall within the scope of the disclosure. As discussed above, the use emoji sequences can be a more intuitive and user-friendly way of accessing information pertaining to a particular company, without having to remember a myriad of different addresses or identifiers that may rely on less intuitive alpha-numeric sequences. Take for example a hypothetical airline called "Acme Airlines." To access information regarding Acme airlines a user may need to know its web address, social media handles, and its digital wallet information in order to be able to fully engage with the company using the entirety of its online and computer-based services. Using alpha-numeric characters can pose a challenge because a user would have to remember the web address for acme airlines which could use the full Acme Airlines name, or use shortened versions of the name such as Acme Air or AAL for short. This potential confusion could be exacerbated if Acme Airlines used its full name in its web address, but used Acme Air for its social media profiles. If a customer wanted to pay Acme Airlines over the internet for flights, then in one or more examples, the user may need to also know the unique alpha-numeric code for Acme Airlines digital wallet, which may consist of random alpha-numeric sequences, rather than an alpha-numeric sequence that is correlated to the name of the airline.

Instead of memorizing all of these different alpha-numeric sequences, if a user was able to simply access Acme Airlines' information in one place by simply recalling a sequence of emojis (or other easily remembered and identifiable string of characters), then the user may be able to more successfully engage online with the airline. In the example of FIG. 1, an example emoji sequence 100 can include a sequence of individual emojis 102, 104, and 106, that the user can more readily memorize to identify Acme Airlines. Using the Acme Airlines examples, the emoji sequence 100 pertaining to Acme Airlines can include a first emoji 102 which can be of an airplane. Airplane emoji 102 can be easy to memorize for a customer of Acme Airlines because it can visually depict an airplane which is the business of Acme Airlines.

To further differentiate Acme Airlines from other airlines, the Emoji sequence 100 can also include additional emojis 104, 106, and 108. In the example of Emoji sequence 100, emojis 104, 106, and 108 can include emoji's pertaining to vacation destinations (such as a beach, castle, and mountains respectively) that can help a user to differentiate Acme Airlines from other airlines and can be easy to remember (since most travelers would be purchasing flights to vacation destinations.) The example of FIG. 1 is meant as an example only and should not be viewed as limiting in any way. Other exemplary emoji sequences could include more or less emojis in the sequence.

Because emoji sequences could be used by enterprises to establish their digital presence, or provide access to information regarding a particular enterprise, in one or more examples, a marketplace for Emoji sequences can be established so that particular Emoji sequences can be bought or sold in a verifiable and secure way, thereby ensuring that Emoji sequences will be owned by a single entity and will not be able to be counterfeited. In one or more examples, a marketplace for the buying and selling of Emoji sequences can be established digitally (i.e., using computing systems) by using distributed ledger technologies such as blockchain. Using a distributed ledger service such as blockchain call allow for transactions to be verified without requiring a third party to verify transactions between two parties.

Figure 2:
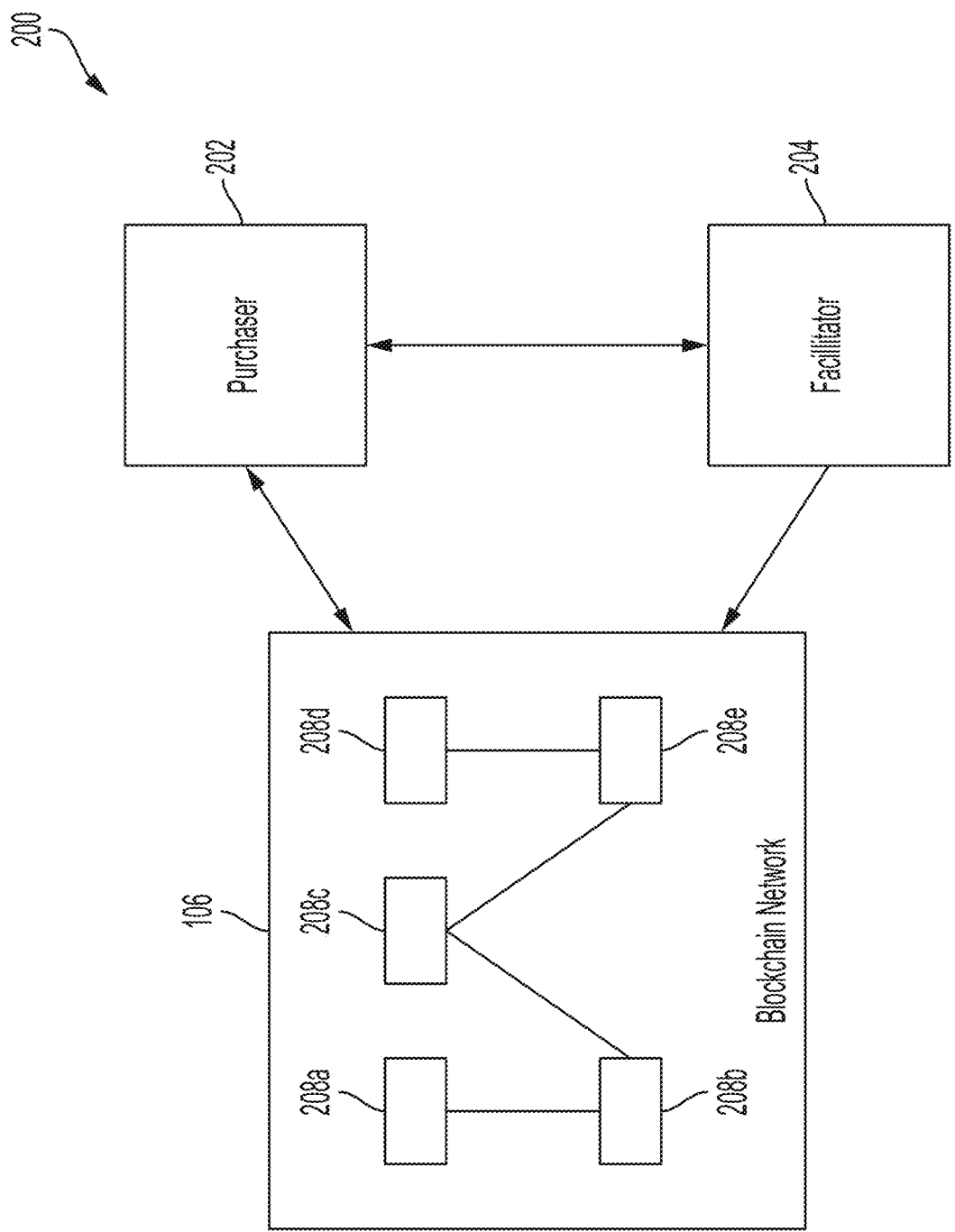
FIG. 2 illustrates an exemplary computing system for facilitating an emoji sequence marketplace according to examples of the disclosure.

FIG. 2 illustrates an exemplary computing system for facilitating an emoji sequence marketplace according to examples of the disclosure. In the example of FIG. 2, the system 200 can include a purchaser device 202. The purchaser device 202 can represent the computing system of a purchaser, who wishes to purchase an emoji sequence that can be implemented on one or more processors on, for example, a mobile device or a desktop computing environment. In one or more examples, the system 200 can also include a facilitator computing system 204 that is configured to sell emoji sequences to the purchaser via the purchaser computing system 202.

In one or more examples, the computing system can include a blockchain network 206 that can include a plurality of nodes 208A-E (eg. Servers) that can each maintain respective copies of a blockchain. In actual practice, the blockchain network 206 may include hundreds or thousands of nodes. In some embodiments, blockchain network 206 may be a distributed peer-to-peer network as in known by those skilled in the art. In some embodiments, blockchain network 206 of nodes 208A-E can implement known consensus algorithms to validate transactions submitted to the blockchain network 206. A verified transaction may include transferred cryptocurrency, contracts, records, or other information to be recorded to the blockchain. In some embodiments, multiple transactions are combined together into a block of data that is verified across blockchain network 206. Once verified, this block of data can be added to an existing blockchain maintained by each of nodes 208A-E.

In some embodiments, a user can initiate transactions to be submitted to blockchain network 206 using the purchaser device 202. For example, the user may submit a transaction using an application configured to interact with blockchain network 206. For example, the purchaser device may generate and transmit cryptocurrency transactions to node 208A for validation and verification. Purchaser device 202 may include software downloaded from a digital distribution platform (e.g., App Store on Apple devices or Microsoft Store on Windows devices) or a content server. In some embodiments, the application implemented on the purchase device can provide a graphical user interface (GUI) that enables the user to generate transactions between his or her blockchain wallet and a blockchain wallet of a target recipient of cryptocurrency funds.

In one or more examples, and as described in further detail below with respect to the example of FIG. 3, the system 200 can be configured to facilitate the purchasing, securing, and, implementation of an emoji sequence to a purchaser 202 by the facilitator 204. In one or examples, the system 200 can be configured to allow for a purchaser to purchase an emoji sequence, have the purchased emoji sequence associated with a digital token, and then have the digital token transferred to the purchaser so that the purchaser can use the digital token to maintain information associated with the purchaser that can be viewed by the public safely and securely.

Figure 3:
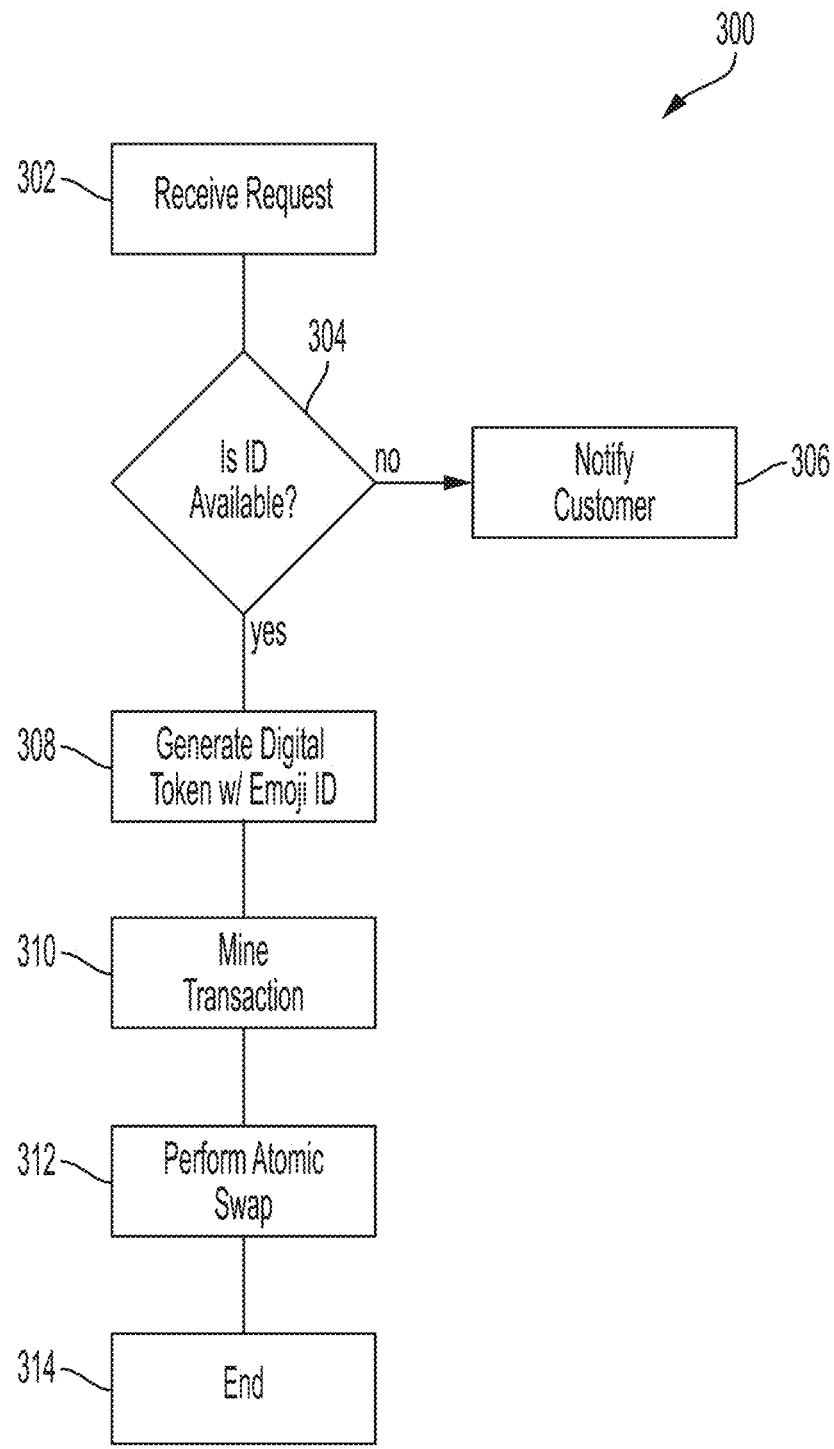
FIG. 3 illustrates an exemplary process for purchasing an Emoji sequence according to examples of the disclosure.

FIG. 3 illustrates an exemplary process for purchasing an Emoji sequence according to examples of the disclosure. In the example of FIG. 3, process 300 can begin at step 302 wherein a request for a particular emoji sequence is received. In one or more examples, a third party service can host and facilitate the emoji sequence buying and registration process, and thus receiving a request at step 302 can include receiving a request from a user/purchaser that requests a specific emoji sequence. Alternatively or in addition to the example above, the third party facilitator can publish one or more emoji sequences (or partial emoji sequences) and a purchaser can indicate at step 302 that they wish to purchase a particular emoji sequence that has been published by the third-party facilitator and advertised using a website.

Once the request for a particular emoji sequence has been received at step 302, the process 300 can move to step 304 wherein the availability of the emoji sequence requested at step 302 is determined. As discussed above, in the example in which the emoji sequence marketplace is maintained using a distributed ledger such as blockchain, verifying the availability of the emoji sequence can include checking with the base node of the blockchain to determine whether the requested emoji sequence is available. If it is determined that the requested emoji sequence is not available, then the process 300 can move to step 306 wherein the transaction (i.e., purchasing the emoji sequence) will fail, and the user is notified of the failure. In one or more examples, if there are multiple parties who are trying to simultaneously purchase a particular emoji sequence, then the process 300 can award the emoji sequence to the purchaser who comes up with the first transaction mined (discussed in further detail below)

If the emoji sequence requested at step 302 if found to be available at step 304, then the process 300 can move to step 308 wherein a digital token can be created using the requested emoji sequence that can be used to establish ownership of the ID. In one or more examples, the digital token can be derived from the emoji sequence string and can be unique and deterministic. In one or more examples, at step 308, a hash of the emoji sequence string plus some additional metadata can be generated. In one or more examples, generating a hash could include taking the public key of an encryption scheme of the user (that the user can provide to the facilitator either when requesting the emoji sequence at step 302, or once it is determined that the ID is available at step 304) and use the public token to generate the hash.

Public and private keys are an integral component of cryptocurrencies built on blockchain networks and are part of a larger field of cryptography known as public-key cryptography (PKC) or asymmetric encryption. The goal of PKC is to easily transition from a first state (e.g., a private key) to a second state (e.g., a public key) while reversing the transition from the second state to the first state nearly impossible, and in the process, proving possession of a secret key without exposing that secret key. The product is subsequently a one-way mathematical function, which makes it ideal for validating the authenticity of transactions such as cryptocurrency transactions because possession of the first state such as the secret key cannot be forged. PKC relies on a two-key model, the public and private key.

The general purpose of PKC is to enable secure, private communication using digital signatures in a public channel that is susceptible to potentially malicious eavesdroppers. In the context of cryptocurrencies, the goal is to prove that a spent transaction was indeed signed by the owner of the funds, and was not forged, all occurring over a public blockchain network between peers. A private key of a blockchain wallet unlocks the right for the blockchain wallet's owner to spend cryptocurrency funds in the blockchain wallet and therefore must remain private. A digital token that is cryptographically linked to the blockchain wallet's private key can be publicly available to all users to enable other users to send cryptocurrencies to the user's blockchain wallet. For example, the wallet address may be a public key generated from the blockchain wallet's private key using one or more PKC algorithms.

In one or more examples, at step 308, a hash could be created by concatenating the purchased emoji sequence with metadata associated with the emoji sequence such as a Merkle tree (described in further detail below) and with the encryption public key provided by the user. Such a hash can provide a unique, deterministic, and verifiable token that can conclusively associate an emoji sequence with a user through the purchaser's public key. As will discussed in detail further, the purchaser can use the private key associated with their public key to modify the data associated with the emoji sequence.

In one or more examples in which a database is used to store the information associated with a particular emoji sequence, at step 308, the emoji sequence can be associated with the purchaser, and anyone accessing the public available database can gain knowledge of the user's public key by accessing the database (only the purchaser of the emoji sequence would have knowledge of the private key, and thus could be the only one who has the ability to the modify the data stored in the database).

Once the digital token is established at step 308, the process can move to step 310 wherein the transaction (i.e., creation of the digital token that associates the emoji sequence with the user) can be mined using a distributed ledger such as blockchain. As discussed above, the process of purchasing an emoji sequence can be structured as a transaction to be executed on a distributed ledger, and thus the process of mining the transaction at step 310 can include the process of creating a block on the blockchain and then adding the block to the blockchain (which is kept by each and every node of the distributed ledger). As part of the mining process, the miner can also verify that the transaction (i.e., the creation of the emoji sequence ID that is now associated with a particular enterprise) is accurate.

After the emoji sequence transaction has been mined and made part of the blockchain at step 310, the process can move to step 312 wherein the ownership of the emoji sequence (in the form of a digital token) is transferred to the purchaser of the emoji sequence. In one or more examples, the transfer can occur by the purchaser remitting payment for the emoji sequence to the facilitator, or in one or more examples, the ownership of the emoji sequence can be transferred to the purchaser by an atomic swap. In one or more examples, an atomic swap can refer the process of exchanging cryptocurrencies between the purchaser and the facilitator, wherein the purchaser transfers cryptocurrency to the facilitator, and the facilitator in return transfers the digital token (structured as a currency transaction) to the purchaser.

There are many ways the key-value system can be persisted and represented in computer memory and/or on persistent storage. In one or more examples, a mapping could be used (known as a Dict, Map or HashMap), which can maintain an associated list of the emoji sequences and their associated values. In another example, a high-performance key-value system such as LMDB, RocksDB, BerkeleyDB, Memcache or Redis could be used to associate the emoji sequences and their associated data. In another example, a Relational Database Management System (RDMS), such as PostgreSQL or MySQL can be used to map the emoji sequences to their data using database tables and foreign key associations. In another example, a NoSQL document storage database, such as MongoDB can be used to associate the relevant data values with the emoji sequence. In another example, one could use flat files, storing the associated data for each emoji sequence in a separate file or directory named using an algorithm to map an emoji sequence to the file or directory name. In the preferred implementation, a blockchain system could make use of any of the above storage strategies to provide a decentralized persistent storage system for the access and maintenance of the emoji sequence system.

In the example of a centralized database implementation, ownership of an emoji sequence can be conferred by associating a user id with the emoji sequence (sequences, if they own more than one) in the database. Write access to that data can be controlled by the business logic of the database controller logic in the server application. In a blockchain-based storage implementation, the emoji sequence keys can be associated with a private key. This key and its public key counterpart can be used to indicate ownership of the emoji sequence. In one or more examples of the disclosure, associating emoji sequences with keys, can include establishing a 1:1 relationship using a map in a smart contract, such as Solidity on Ethereum. In another example, a 1:1 relationship between private key and emoji sequence could be constructed using a script and requiring a digital signature to prove the ownership relationship between the key and emoji sequence. Such an implementation is possible in principle on the existing Bitcoin, Bitcoin Cash, ZCash or similar blockchains. In one or more examples, the emoji sequence token can be embedded in an output of the blockchain using homomorphic properties of the blockchain's data structures. In one or more examples, such a strategy can be implemented in Mimblewimble-based protocols, such as Grin, Beam, or Tari.

Data recorded on blockchain systems are essentially immutable by virtue of chained data structures and proof of work. For the emoji system system, in one or more examples, it can be desirable to make the key-value lookup tables part of the immutable information set stored on the blockchain. This can be done in several ways. For smart contract platforms, such as Ethereum, the emoji sequence database can be stored as part of the smart contract and as such is represented on the blockchain using the native data storage mechanisms of the underlying protocol. For non-smart contract platforms, one can summarize the emoji sequence database state and store that instead.

There are several ways one can approach this summation process. In one example, one could serialize the emoji sequence data and feed it into a hashing algorithm, such as Blake2b. In one or more examples, a computing system could represent the emoji sequence data in a Merkle tree or one of several similar tree structures, and use the root of the tree as the data summary. The summary, which essentially is a unique and irreversible fingerprint of the current state of the emoji sequence data values, can be associated with the token and owner key by embedding the summary in the unspent transaction output (UTXO) that is associated with owner's private key and emoji sequence token. This can be achieved by including the summary into the output features which is a characteristic of most output-based blockchain systems. In Mimblewimble-based blockchains, another approach could be to add the summary to the blinding factor of the commitment. This achieves the function of associating the data with the owner's token and the emoji sequence key, while also increasing privacy by obscuring the fact that there is any functional data present in the output at all.

Once the atomic swap has been performed at step 312, the process 300 can move to step 314 wherein the process is terminated. At the conclusion of the process 300, the purchaser can now own an emoji sequence that is unique and verifiable, and that allows them to give access to the information stored in the token in a secure manor, while still allowing only the owner to have the ability to modify the data contained within the digital token.

In one or more examples of the disclosure, the original issuer of the emoji sequence (the asset issuer) may wish to maintain certain privileges within the emoji sequence ecosystem. For example, the asset issuer may wish to authorize certain transfers; or prevent some emoji sequence transfers from occurring. In one or more examples the asset issuer may wish to enforce certain business logic rules; for example, the asset issuer may wish to place a maximum limit onto the number of times and emoji sequence can be transferred. In another example, the asset issuer may wish for some emoji sequences to be returned to them after a certain period, rather than transferring ownership to the emoji sequence user indefinitely. Such control may be difficult in blockchain implementations because blockchains can be censorship resistant and decentralized in their very nature. One approach to implementing admin functionality on blockchain implementations of emoji sequences would be to require all transfers of emoji sequences, as discussed above, to contain a multi-party signature, of which one signatory is always the asset issuer. Another approach would be to modify the consensus rules of the blockchain protocol to acknowledge the existence of the asset issuer and grant the asset issuer additional privileges over the transfer of emoji sequence tokens that normal users of the protocol do not have. In this implementation, the protocol rules do not have to limit themselves to acknowledging emoji sequence as the only asset on the blockchain. A preferred implementation would be to allow multiple assets to be registered on the protocol, and grant additional privileges to the distinct asset issuers for their distinct digital assets that have been registered and issued on and using the blockchain protocol.

As briefly described above, the digital token created by the Emoji sequence purchasing processing outlined in FIG. 3 can include metadata stored in the form of a Merkle Tree. The Merkle tree can serve as a data structure that can allow for the owner of the emoji sequence to store data (such as its web address, social media handles, or digital wallet information) that it wants to make publically available to customers or other users who will use the owner's emoji sequence to gather information about the owner. The Merkle tree structure, while achieving the aims described above, also lends itself well to storing information for access on a distributed ledger system such as blockchain. As described in detail below, the data stored in the Merkle tree of the digital token can be formatted in a manner that can be efficiently handled by a blockchain network.

In one or more examples, and if the data is not stored in a blockchain network, the associated data can be stored in a RDMS database or other type of database and the data stored in the database can be associated with the emoji sequence via a FOREIGN KEY.

Figure 4:
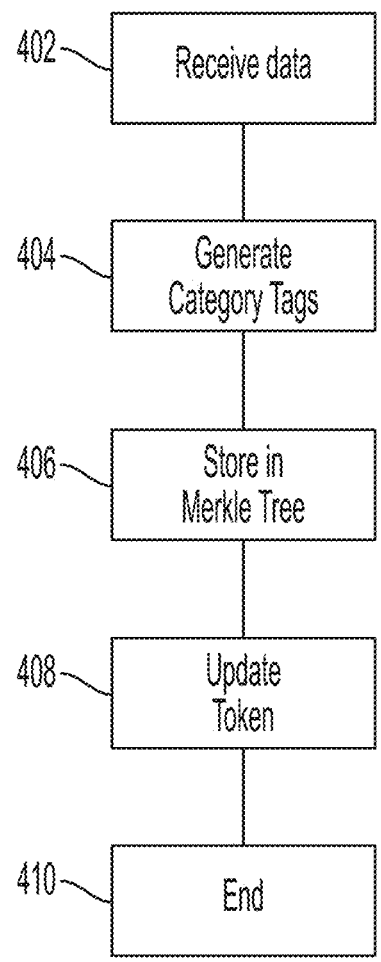
FIG. 4 illustrates an exemplary process for associating data with an Emoji sequence according to examples of the disclosure.

FIG. 4 illustrates an exemplary process for associating data with an Emoji sequence according to examples of the disclosure. In one or more examples, the process 400 described with respect to FIG. 4 can be implemented on a distributed ledger network such as the system described above with respect to FIG. 2. In one or more examples, the process 400 of FIG. 4 can begin at step 402, wherein the data to associated with a particular Emoji sequence is received. In one or more examples, updating the data associated with the Emoji sequence can be structured as a blockchain transaction, wherein the owner of the digital token associated with the Emoji sequence (i.e., the owner of the Emoji sequence) can submit a transaction to the blockchain that "spends" the old token state to a new one with an update Merkle root and Merkle tree. In one or more examples, the transaction can be configured to not change the Emoji sequence itself, because doing so may cause the digital token to no longer be recognized by the system.

In light of the considerations above, the process 400 can be configured to update the digital token associated with the Emoji sequence by modifying the Merkle tree associated with the Emoji sequence. Thus, once the modified or additional data is received at step 402, the process can move to step 404 wherein the data is tagged as belonging to one or more categories. By constraining the data to certain types using the tags, the system can place upper bounds on the amount of data to be stored for every Emoji sequence. In other words, in an unconstrained system, the amount of data required for an Emoji sequence could be infinite and thus the system would not have a way to estimate its memory consumption, but by categorizing the data, the system can have a sense of the upper bound of memory needed for a particular Emoji sequence.

Table 1 below illustrates an exemplary format of the Emoji sequence token:

| Field | Size | Description |
| --- | --- | --- |
| id | 4-32 bytes | The vanity ID itself |
| Merkle root | 32 bytes | A fingerprint of the attached VEID data. |
| sig | 64 bytes | A signature from the facilitator certifying the token |

As shown above in table 1, each digital token associated with an emoji can include an ID filed that occupies 4-32 bytes of memory and stores information relating to the Emoji sequence itself. The token can also include the Merkle root, which can occupy 32 bytes of memory (due to the constraint provided the category tags, explained in further detail below), and the token can include a signature field that can occupy 64 bytes of memory and can include a digital signature facilitator that proves the authenticity of the emoji sequence. The fields and memory sizes described above with respect to Table 1 are meant as examples only, and should not be considered limiting to the disclosure in any way. A person of skill in the art would recognize that a digital token could include more or less fields, fields of different types, and fields that consume more or less memory.

Returning to the example of FIG. 4, the data received at step 402 can be tagged or categorized into one or more categories. Table 2 below shows an exemplary categorization scheme according to examples of the disclosure.

| Tag | Type/Size | Description |
| --- | --- | --- |
| 0x0101 | 32 bytes | Public key |
| 0x0102 | 64 bytes | Facillitator Schnorr signature (R, s) |
| 0x0201 | 69 bytes | Cryptocurrency standard address |
| 0x0202 | 69 bytes | Cryptocurrency sub address |
| 0x0203 | 56 + 2 bytes | Onion3 address |
| 0x03nn | nn bytes | Web URL |
| 0x0401 | 32 bytes | Merkle Root |
| 0x05nn | nn bytes | Arbitrary UTF-8 string data |

As shown above in Table 2, category tags can include Web addresses, digital wallet information, social media handles. The above listings are meant as examples and should not be seen as limiting to the disclosure. In one or more examples, the tags and type of information stored by the system can include a diverse array of information including cryptocurrency addresses, internet addresses/urls, DNS records, text records, location data, etc. In one or more examples of the disclosure, the information itself can have its own ID. For instance, a social media handle may have an ID (such as a login or screenname), thus the process 400 of FIG. 4 can include associating the emoji sequence with the ID and/or functionality associated with the underlying data. In the example of a social media account, at step 404, the emoji sequence can be associated with the social media account's ID, and can further be associated with the functionality of the social media account, meaning that when the emoji sequence is invoked, it will engage with the functionality of the social media platform as if the user had directly invoked the social media account ID.

In one or more examples of the disclosure, and to allow for users to access data using emoji sequences, the sequence can allow web and mobile clients, such as browsers and specially written applications to access the data associated with emoji sequences. In one or more examples, access can be enabled by defining and implementing a REST API for emoji sequences. REST APIs are well suited for centralized database implementations of emoji sequence. REST APIs can also be written for blockchain implementations, where an individual blockchain node operator could choose to expose the REST API for her node and allow requests to be made against it assuming the blockchain node has been written to act as a REST API server. In addition to REST APIs other APIs could be implemented as well, including JSON-RPC, SOAP, gRPC and many other similar internet-based API protocols. In one or more examples, Blockchain node implementations can offer a gRPC API interface to client applications. One example of a service that this API, whether centralized or on a blockchain, may facilitate, is a web application that users can use as a directory lookup service, akin to a modern-day, emoji-based telephone directory or "Yellow Pages". Another use of the API is to implement a web browser that can convert any web page that contains emoji sequences in its content into a live directory service, allowing users to look up the associated emoji sequence data without leaving the web page they are browsing. A further application would be to allow the blockchain node or centralized emoji sequence server act as a Domain Name Service (DNS) server, translating emoji sequences into IP addresses for web browser resolution, or mail (MX) records, or any other DNS record currently defined. In essence, the emoji sequence service extends DNS to allow emoji sequences as web domains. Another exemplary application would be to make use of a mobile application that allows users to look up emoji sequence data from within their device's applications directly. For example, in social media feeds, users could jump straight to a emoji sequence owner's website, or tip them cryptocurrency, or send them an email—depending on what data the emoji sequence owner linked to their emoji sequence—without having to look any of that information up; only the emoji sequence is published in the social media feed.

Once the received data has been categorized at step 404, the process 400 can move to step 406 wherein the tagged data can be stored in a Merkle tree 406. As described above, the updating of data can be structured as a blockchain transaction in which the old token state is spent to a new token with updated Merkle root and an updated Merkle tree. Thus at step 406, the categorized data is converted into a Merkle tree with an updated Merkle root (described in detail below with respect to FIG. 5)

Once the new Merkle tree has been generated at step 406, the process 400 can move to step 408 wherein the token is updated on the blockchain network. In one or more examples, and as described above, the token can be updated on the blockchain network by structuring the update as a blockchain transaction. Once the token has been updated at step 408, the process 400 can move to step 410 wherein the process is terminated.

Figure 5:
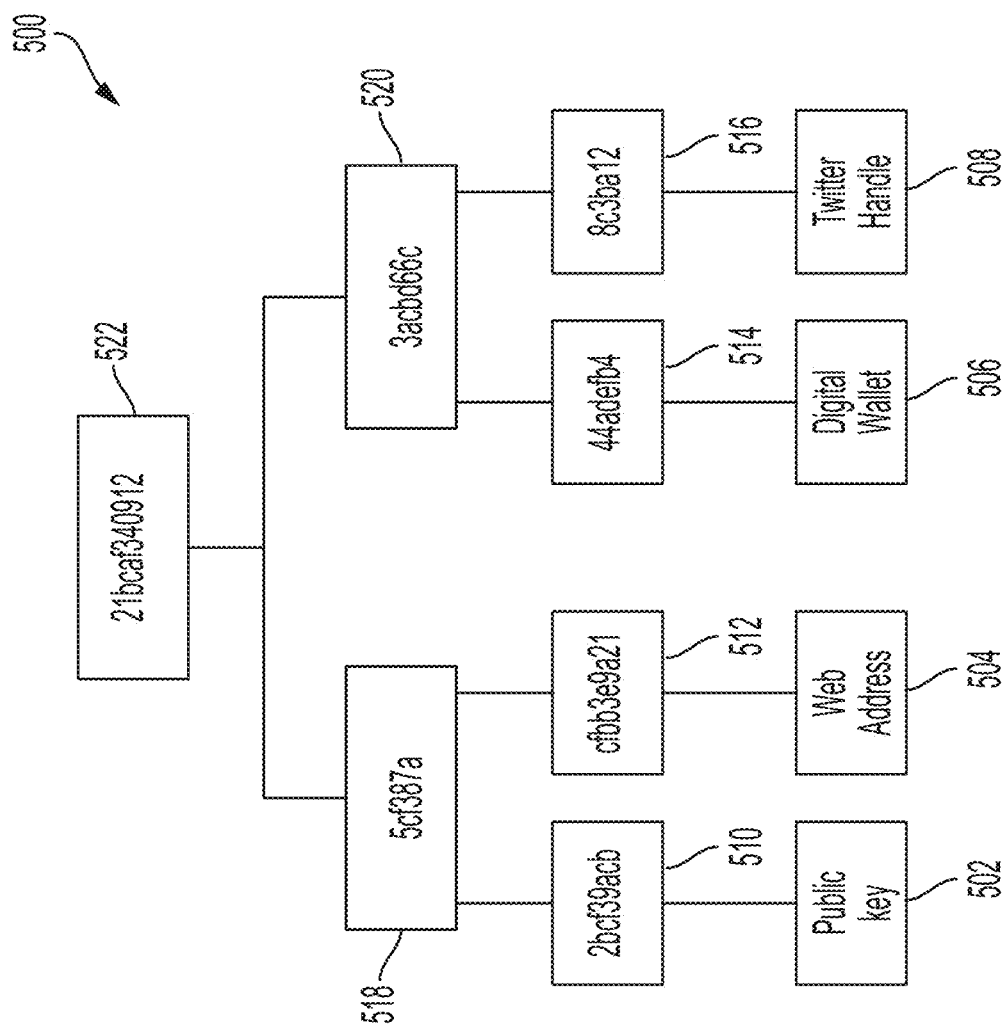
FIG. 5 illustrates an exemplary Merkle tree associated with a Emoji sequence according to examples of the disclosure.

FIG. 5 illustrates an exemplary Merkle tree associated with a Emoji sequence according to examples of the disclosure. As described above, the data token associated with an Emoji sequence can include a Merkle tree that is stored in a block or blocks on the blockchain network. The Merkle tree 500 illustrates an exemplary way to store the data associated with an Emoji sequence using a Merkle tree.

In one or more examples, the Merkle tree 500 can include information 502, 504, 506, and 508. In or more examples, information 502, 504, 506, and 508 can represent unencrypted information such as a web address, or digital wallet address, etc, pertaining to the owner of the Emoji sequence. In one or more examples, each piece of information 502, 504, 506, and 508 can be converted into a hash 510, 512, 514, and 516 respectively. In one or more examples, and as described above, a hash can be a function that converts an input value of varying size and length to an alpha-numeric representation of a fixed length. Thus, hash 510 for example, can represent a hash of the public key data found at node 502 of the Merkle tree 500. Each information 502, 504, 506, and 508, can be converted to respective alphanumeric representations 510, 512, 514, 516 using a hash function.

In one or more examples, pairs of hash values 510, 512, 514, and 516 can be concatenated and hashed into a new value. For instance, hash values 510 and 512 can be concatenated and hashed into a new value 518. Similarly, has values, 514 and 516 can be concatenated and hashed into a new value 520. Finally, hash values 518 and 520 can be concatenated and hashed into a single hash value 522 that can be referred to as the root of the Merkle tree. The root 522 of the Merkle tree 500 can represent a single and distinguishable alphanumeric value that can represent all of the information found at nodes 502, 504, 506, and 508.

Figure 6:
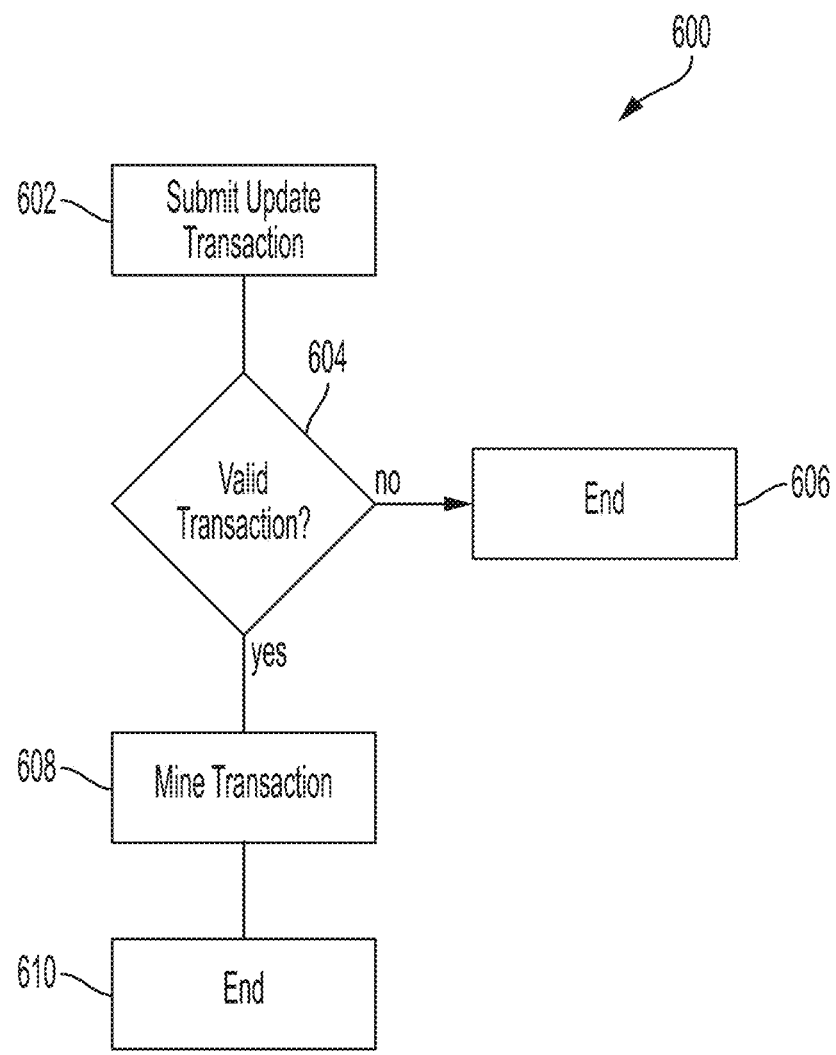
FIG. 6 illustrates an exemplary process for updating the data associated with an Emoji sequence according to examples of the disclosure.

As described above, the process of updating the data associated with an Emoji sequence can be structured as a transaction that is authenticated and recorded on a blockchain network. FIG. 6 illustrates an exemplary process for updating the data associated with an Emoji sequence according to examples of the disclosure. In one or more examples, the process 600 of FIG. 6 can begin at step 602 wherein the updated transaction (generated with respect to the example of FIG. 4) is received by the blockchain network. Once the updated transaction is received by the blockchain network at step 602, the process can move to step 604 wherein the received transaction can be analyzed to determine if the transaction is valid. Validating the transaction can refer to the process by which a blockchain validates that a new block to be added to the blockchain is validated as is known in the art.

If it is determined that the transaction is not valid at step 604, then the process 600 can move to step 606 wherein the process is terminated. If however, the transaction is determined to valid at step 604, then the process 600 can move to step 608 wherein the updated transaction is mined. In the context of FIG. 6, mining can refer to the process of creating a block for the blockchain network, and then having each node of the blockchain network add the block to their blockchain. After the transaction has been mined at step 608, the process 600 can move to step 610 wherein the process is terminated.

The process outlined about in FIG. 6 can allow for the owner of an Emoji sequence to associate useful and pertinent data about the owner in a manner that is secure and allows for third party access with minimal risk of cyberattacks or malicious use of the data. From the user perspective, the Emoji sequence can allow for retrieval of information about a particular entity, without having to memorize a complicated alphanumeric sequence, or without having to go to different repositories of information to collect data.

Figure 7:
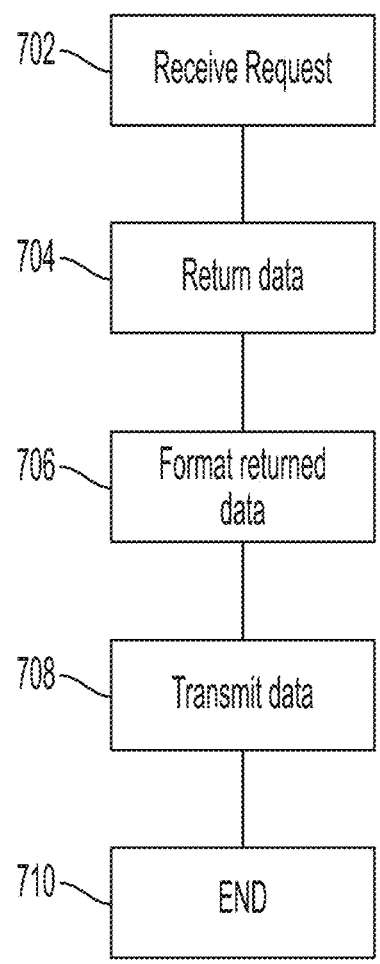
FIG. 7 illustrates an exemplary process for accessing information associated with an Emoji sequence according to examples of the disclosure.

FIG. 7 illustrates an exemplary process for accessing information associated with an Emoji sequence according to examples of the disclosure. In one or more examples, the process 700 of FIG. 7 can begin at step 702 wherein the a third-party who wants to access information associated with an Emoji sequence makes a request to the base node the blockchain network that stores the data for the information that is requested. In one or more examples of the disclosure, the request can include the emoji sequence associated with the information, and specific category tags (described above) that the third-party wants to receive. In one or more examples, if the third-party wants to receive all of the stored information associated with an Emoji sequence, then they can omit any category tags from their request in which case the system will return the entirety of the data associated with the Emoji sequence.

Once the request is received at step 702, the process 700 can move to step 704 wherein the base node of the blockchain on which the data is stored can work to return the data associated with the request. In one or more examples, returning the data can include analyzing the blocks on the blockchain to determine if any of the blocks pertain to the Emoji sequence specified by the third-party, and if a block is found, then the data found in the block (i.e., the Merkle tree) can be returned.

Once the data is returned at step 704, the process 700 can move to step 706 wherein the returned data is formatted for transmission to the user. In one or more examples of the disclosure, the returned data can be serialized by the returning blockchain node and the returned to the user. Once the data has been formatted at step 706, the process 700 can move to step 708 wherein the returned data is transmitted to the requester. Once the data has been transmitted at step 708, the process 700 can move to step 710 wherein the process is terminated.

The example provided below, shows an example form by which a requester can request data associated with an emoji sequence:
Message type: VEID request
Payload:
   The DA id
   VEID [UTF-8 string] The emoji string
   Category Tags [Array of 16-bit little-endian unsigned integers]. The data the client is requesting about this VEID. An empty Category tag parameter indicates that the node should return all VEID data.
Response: EMOJI SEQUENCE response
Payload:
   Status: [1 unsigned byte]. The value indicates "Ok" or "Emoji sequence does not exist".
   The DA id
   The Emoji sequence
   Data: [Array of Data]
   VEIDData:
      Category Tag [16-bit little-endian unsigned integer]. The category tag for the data in Data.
      Data [byte array]. The data associated with the VEID for the given tag. The data format returned depends on the value of Tag.
Example:
VEIDRequest  [0x0101, 0x0201]

```
VEIDResponse 0x01 [
0101    70350e09c474809209824c6e6888707b7dd09959aa227343b5106382b856f73a 0201    44TariLabskSiGBNMDwYtN18obc8AemS33DBLWs3J7oXjrpDtQGv7SqSsaBYBb98uNbr2VBBEt7f2wfn3RVGQ
        BEP3A 0201    44TariLabsA3rjsjSDGdsj78djAemS33DBLWsdfg8obc8s3H7oXjrpDtQGv7SqSsaBYBb98uNbr2VBBEtFhs7
        FFsjS]
```

In one or more examples and as briefly described above, an Emoji sequence can be transferred between parties (i.e., ownership of the Emoji sequence can be transferred). In one or more examples, transfer of an Emoji sequence can be achieved using an atomic swap and thus does not require the issuer of the Emoji sequence (i.e., the facilitator) to be involved in such a transaction. In an atomic swap, the seller receivers her payment on delivery of the asset, or else the transfer fails completely. No escrows or third parties are necessary in atomic swaps.

In centralized database implementations, ownership transfer can be achieved by reassigning the emoji sequences's owner id to that of the new owner, for example by executing an update query on the database. Such a query could be initiated by the current owner, or by an admin user that has access to the database or API calls that can execute such a query. In smart-contract blockchain implementations, such as Ethereum, ownership changes can be executed through a suitable "transfer" function in the smart contract and providing the relevant authorization data and digital signatures with the ethereum transaction. In script, or output-based blockchains, ownership transfer can take place using the underlying protocol's standard transaction mechanics as a vehicle. In one or more examples of the disclosure, an emoji sequence owner could transfer or sell the sequence to another party by "spending" the output that is associated with the emoji sequence to one that the new owner controls. The initial owner may or may not receive payment for the process in a separate transaction.

Figure 8:
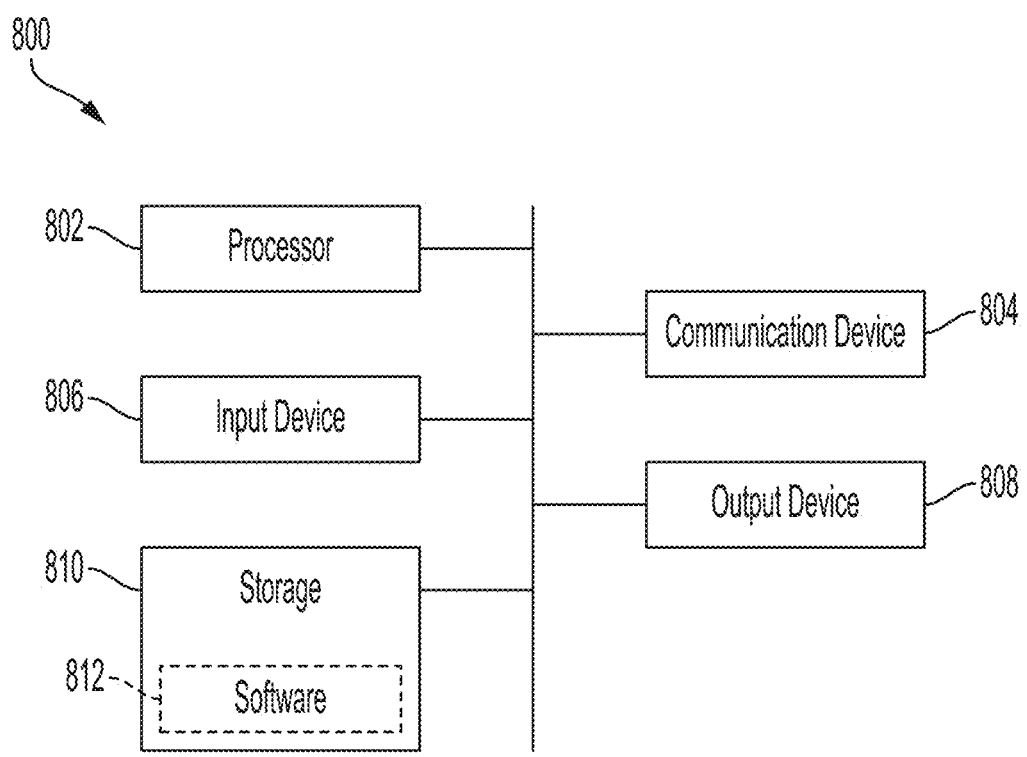
FIG. 8 illustrates an example of a computing device in accordance with one embodiment.

FIG. 8 illustrates an example of a computing device in accordance with one embodiment. Device 800 can be a host computer connected to a network. Device 800 can be a client computer or a server. As shown in FIG. 8, device 800 can be any suitable type of microprocessor-based device, such as a personal computer, workstation, server, or handheld computing device (portable electronic device) such as a phone or tablet. The device can include, for example, one or more of processors 802, input device 806, output device 808, storage 810, and communication device 804. Input device 806 and output device 808 can generally correspond to those described above and can either be connectable or integrated with the computer.

Input device 806 can be any suitable device that provides input, such as a touch screen, keyboard or keypad, mouse, or voice-recognition device. Output device 808 can be any suitable device that provides output, such as a touch screen, haptics device, or speaker.

Storage 810 can be any suitable device that provides storage, such as an electrical, magnetic, or optical memory, including a RAM, cache, hard drive, or removable storage disk. Communication device 804 can include any suitable device capable of transmitting and receiving signals over a network, such as a network interface chip or device. The components of the computer can be connected in any suitable manner, such as via a physical bus or wirelessly.

Software 812, which can be stored in storage 810 and executed by processor 802, can include, for example, the programming that embodies the functionality of the present disclosure (e.g., as embodied in the devices as described above).

Software 812 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 810, that can contain or store programming for use by or in connection with an instruction execution system, apparatus, or device.

Software 812 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 800 can implement any operating system suitable for operating on the network. Software 812 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Some examples of the disclosure are directed to a method for assigning an emoji sequence to a user, the method comprising: receiving a request from the user to acquire the emoji sequence, wherein the emoji sequence comprises one or more emojis, associating the emoji sequence with the user, associating the emoji sequence with one or more data fields, wherein associating the emoji sequence with the one or more data fields includes associating the emoji sequence with one or more functionalities associated with the one or more data fields, and configuring a data storage system such that when it receives the emoji sequence the data storage system provides access to the one or more functionalities associated with the one or more data fields.

Some examples of the disclosure are directed to A system for assigning an emoji sequence to a user, the system comprising: a memory, one or more processors, and one or more programs, wherein the one or more programs are stored in the memory and configured to be executed by the one or more processors, the one or more programs when executed by the one or processors cause the processor to: receive a request from the user to acquire the emoji sequence, wherein the emoji sequence comprises a one or more emojis, associate the emoji sequence with the user, associate the emoji sequence with one or more data fields, wherein associating the emoji sequence with the one or more data fields includes associating the emoji sequence with one or more functionalities associated with the one or more data fields, and configure a data storage system such that when it receives the emoji sequence the data storage system provides access to the one or more functionalities associated with the one or more data fields.

Some examples of the disclosure are directed to A system for assigning an emoji sequence to a user, the system comprising: a memory, one or more processors, and one or more programs, wherein the one or more programs are stored in the memory and configured to be executed by the one or more processors, the one or more programs when executed by the one or processors cause the processor to: receive a request from the user to acquire the emoji sequence, wherein the emoji sequence comprises a one or more emojis, associate the emoji sequence with the user, associate the emoji sequence with one or more data fields, wherein associating the emoji sequence with the one or more data fields includes associating the emoji sequence with one or more functionalities associated with the one or more data fields, and configure a data storage system such that when it receives the emoji sequence the data storage system provides access to the one or more functionalities associated with the one or more data fields.

Additionally or alternatively to one or more examples disclosed above, the method comprises: generating a digital token based on the emoji sequence, associating a public key of a public key cryptography scheme of the user with the generated digital token, associating the one or more data fields with the generated digital token, and associating the user with the emoji sequence and the generated digital token. Additionally or alternatively to one or more examples disclosed above generating a digital token based on the emoji sequence includes applying a hash function to the emoji sequence. Additionally or alternatively to one or more examples disclosed above associating the public key of the user with the generated digital token includes concatenating the public key with the emoji sequence and applying the hash function to the concatenated emoji sequence and public key. Additionally or alternatively to one or more examples disclosed above associating one or more data fields with the generated digital token includes generating a Merkle tree based on one or more data fields. Additionally or alternatively to one or more examples disclosed above associating one or more data fields with the generated digital token includes concatenating the emoji sequence with the generated Merkle tree root and applying a hash function to the concatenated emoji sequence and Merkle tree root. Additionally or alternatively to one or more examples disclosed above the Merkle tree is generated based on data stored within the one or more data fields. Additionally or alternatively to one or more examples disclosed above generating the Merkle tree includes associating one or more category tags to the data stored within the one or more data fields. Additionally or alternatively to one or more examples disclosed above the method comprises storing the generated digital token on a distributed ledger system, and the distributed ledger system is implemented on a blockchain network. Additionally or alternatively to one or more examples disclosed above placing the digital token on the distributed ledger includes generating a block based on the generated digital token and storing the generated block on a plurality of nodes of the distributed ledger. Additionally or alternatively to one or more examples disclosed above associating the user with the emoji sequence includes transferring ownership of the generated digital token to the user, and wherein transferring ownership of the generated digital token to the user includes executing an atomic swap on the generated digital token. Additionally or alternatively to one or more examples disclosed above the method comprises updating the one or more data fields with data received from the user. Additionally or alternatively to one or more examples disclosed above updating the one or more data fields with data received from the user includes associating one or more category tags with the data received from the user. Additionally or alternatively to one or more examples disclosed above updating the one or more data fields with data received from the user includes generating a Merkle tree based on the data received from the user and the associated one or more category tags. Additionally or alternatively to one or more examples disclosed above the distributed ledger comprises a read-only database. Additionally or alternatively to one or more examples disclosed above the method comprises receiving a request to identify user information associated with the emoji sequence, searching the database to identify the digital token associated with the emoji sequence, retrieving data stored in the one or more data fields; and determining that the second Merkle root is assigned to the digital token; and transmitting the retrieved data to a source of the request to identify user information associated with the emoji sequence.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

This application discloses several numerical ranges in the text and figures. The numerical ranges disclosed inherently support any range or value within the disclosed numerical ranges, including the endpoints, even though a precise range limitation is not stated verbatim in the specification, because this disclosure can be practiced throughout the disclosed numerical ranges.

The above description is presented to enable a person skilled in the art to make and use the disclosure, and it is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown but is to be accorded the widest scope consistent with the principles and features disclosed herein. Finally, the entire disclosure of the patents and publications referred in this application are hereby incorporated herein by reference.

The invention claimed is:

1. A method for assigning a sequence of a plurality of emojis to a user, the method comprising:
receiving a request from the user to acquire the sequence of a plurality of emojis;
applying a cryptographic hash function to the sequence of a plurality of emojis, thereby generating a digital token;
concatenating a public cryptographic key of the user with the digital token;
applying the cryptographic hash function to the concatenated public cryptographic key and digital token, thereby generating a second digital token;
generating a Merkle tree of data stored within one or more data fields, wherein the one or more data fields are associated with one or more functionalities;
generating a Merkle tree root of the Merkle tree;
concatenating the Merkle tree root with the second digital token;
applying the cryptographic hash function to the concatenated Merkle tree root and second digital token, thereby generating a third digital token;
embedding the third digital token in an unspent transaction output (UTXO) that is associated with a private cryptographic key of the user and the digital token; and
configuring a data storage system such that when it receives the sequence of a plurality of emojis the data storage system provides access to the one or more functionalities associated with the one or more data fields.

2. The method of claim 1, wherein generating the Merkle tree includes associating one or more category tags to the data stored within the one or more data fields.

3. The method of claim 1, wherein the method comprises storing the generated digital token on a distributed ledger system, and the distributed ledger system is implemented on a blockchain network.

4. The method of claim 3, wherein placing the digital token on the distributed ledger includes generating a block based on the generated digital token and storing the generated block on a plurality of nodes of the distributed ledger.

5. The method of claim 1, further comprising transferring ownership of the generated digital token to the user, and wherein transferring ownership of the generated digital token to the user includes executing an atomic swap on the generated digital token.

6. The method of claim 1 further comprising:
updating the one or more data fields with data received from the user.

7. The method of claim 6, wherein updating the one or more data fields with data received from the user includes associated one or more category tags with the data received from the user.

8. The method of claim 6, where updating the one or more data fields with data received from the user includes generating a second Merkle tree based on the data received from the user and the associated one or more category tags.

9. The method of claim 1, further comprising:
receiving a request to identify user information associated with the sequence of a plurality of emojis;
searching a database to identify the digital token associated with the sequence of a plurality of emojis;
retrieving data stored in the one or more data fields;
determining that the Merkle tree root is assigned to the digital token; and
transmitting the retrieved data to a source of the request to identify user information associated with the sequence of a plurality of emojis.

10. A system for assigning a sequence of a plurality of emojis to a user, the system comprising:
a memory;
one or more processors; and
one or more programs, wherein the one or more programs are stored in the memory and configured to be executed by the one or more processors, the one or more programs when executed by the one or processors cause the one or more processor to:
receive a request from the user to acquire the sequence of a plurality of emojis;
apply a cryptographic hash function to the sequence of a plurality of emojis, thereby generating a digital token;
concatenate a public cryptographic key of the user with the digital token;

apply the cryptographic hash function to the concatenated public cryptographic key and digital token, thereby generating a second digital token;

generate a Merkle tree of data stored within one or more data fields, wherein the one or more data fields are associated with one or more functionalities;

generate a Merkle tree root of the Merkle tree;

concatenate the Merkle tree root with the second digital token;

apply the cryptographic hash function to the concatenated Merkle tree-root and second digital token, thereby generating a third digital token;

embed the third digital token in an unspent transaction output (UTXO) that is associated with a private cryptographic key of the user and the digital token; and configure a data storage system such that when it receives the sequence of a plurality of emojis the data storage system provides access to the one or more functionalities associated with the one or more data fields.

11. The system of claim 10, wherein generating the Merkle tree includes associating one or more category tags to the data stored within the one or more data fields.

12. The system of claim 10, wherein the processor is caused to store the generated digital token on a distributed ledger system, and the distributed ledger system is implemented on a blockchain network.

13. The system of claim 12, wherein placing the digital token on the distributed ledger includes generating a block based on the generated digital token and storing the generated block on a plurality of nodes of the distributed ledger.

14. The system of claim 10, wherein the processor is caused to transferring ownership of the generated digital token to the user, and wherein transferring ownership of the generated digital token to the user includes executing an atomic swap on the generated digital token.

15. The system of claim 10 wherein the processor is caused to:

update the one or more data fields with data received from the user.

16. The system of claim 15, wherein updating the one or more data fields with data received from the user includes associating one or more category tags with the data received from the user.

17. The system of claim 16, where updating the one or more data fields with data received from the user includes generating a second Merkle tree based on the data received from the user and the associated one or more category tags.

18. The system, of claim 10, wherein the processor is caused to:

receive a request to identify user information associated with the sequence of a plurality of emojis;

search a database to identify the digital token associated with the sequence of a plurality of emojis;

retrieve data stored in the one or more data fields;

determining that the Merkle tree root is assigned to the digital token; and transmit the retrieved data to a source of the request to identify user information associated with the sequence of a plurality of emojis.

19. A non-transitory computer readable storage medium storing one or more programs for assigning a sequence of a plurality of emojis to a user, the one or more programs comprising instructions, which, when executed by an electronic device with a display and a user input interface, cause the electronic device to:

receive a request from the user to acquire the emoji sequence of a plurality of emojis;

apply a cryptographic hash function to the sequence of a plurality of emojis, thereby generating a digital token;

concatenate a public cryptographic key of the user with the digital token;

apply the cryptographic hash function to the concatenated public cryptographic key and digital token, thereby generating a second digital token;

generate a Merkle tree of data stored within one or more data fields, wherein the one or more data fields are associated with one or more functionalities;

generate a Merkle tree root of the Merkle tree;

concatenate the Merkle tree root with the second digital token;

apply the cryptographic hash function to the concatenated Merkle tree root and second digital token, thereby generating a third digital token;

embed the third digital token in an unspent transaction output (UTXO) that is associated with a private cryptographic key of the user and the digital token; and configure a data storage system such that when it receives the sequence of a plurality of emojis the data storage system provides access to the one or more functionalities associated with the one or more data fields.

20. The non-transitory computer readable storage medium of claim 19, wherein generating the Merkle tree includes associating one or more category tags to the data stored within the one or more data fields.

21. The non-transitory computer readable storage medium of claim 19, wherein the electronic device is further caused to store the generated digital token on a distributed ledger system, and the distributed ledger system is implemented on a blockchain network.

22. The non-transitory computer readable storage medium of claim 21, wherein placing the digital token on the distributed ledger includes generating a block based on the generated digital token and storing the generated block on a plurality of nodes of the distributed ledger.

23. The non-transitory computer readable storage medium of claim 19, wherein the electronic device is further caused to transferring ownership of the generated digital token to the user, and wherein transferring ownership of the generated digital token to the user includes executing an atomic swap on the generated digital token.

24. The non-transitory computer readable medium of claim 19 wherein the electronic device is further caused to:

update the one or more data fields with data received from the user.

25. The non-transitory computer readable storage medium of claim 24, wherein updating the one or more data fields with data received from the user includes associating one or more category tags with the data received from the user.

26. The non-transitory computer readable storage medium of claim 25, where updating the one or more data fields with data received from the user includes generating a second Merkle tree based on the data received from the user and the associated one or more category tags.

27. The non-transitory computer readable storage medium, of claim 19, wherein the electronic device is further caused to:

receive a request to identify user information associated with the sequence of a plurality of emojis;

search a database to identify the digital token associated with the sequence of a plurality of emojis;

retrieve data stored in the one or more data fields;

determining that the Merkle tree root is assigned to the digital token; and transmit the retrieved data to a source of the request to identify user information associated with the sequence of a plurality of emojis.

\* \* \* \* \*